(12) United States Patent
Helton

(10) Patent No.: US 6,497,196 B1
(45) Date of Patent: Dec. 24, 2002

(54) HAY BALE CONTAINER

(76) Inventor: Boyd A. Helton, 2374 Fay Jones Rd., Denver, NC (US) 28037

( * ) Notice: Subject to any disclaimer, the term of this patent is extended or adjusted under 35 U.S.C. 154(b) by 0 days.

(21) Appl. No.: 10/094,821

(22) Filed: Mar. 12, 2002

Related U.S. Application Data

(60) Provisional application No. 60/275,120, filed on Mar. 13, 2001.

(51) Int. Cl.$^7$ .................................................. A01K 1/10
(52) U.S. Cl. ...................................... 119/60; 119/51.01
(58) Field of Search .......................... 119/51.01, 51.03, 119/60, 58; 53/556

(56) References Cited

U.S. PATENT DOCUMENTS

| | | | | |
|---|---|---|---|---|
| 310,261 A | * | 1/1885 | Downing | 119/58 |
| 3,851,624 A | * | 12/1974 | Peak | 119/60 |
| 4,020,794 A | * | 5/1977 | Nethery | 119/58 |
| 4,296,595 A | * | 10/1981 | Meiners | 53/118 |
| 4,827,700 A | * | 5/1989 | Rampe et al. | 53/211 |
| 5,012,631 A | * | 5/1991 | Hostetler et al. | 53/556 |
| 5,386,800 A | * | 2/1995 | Pirok | 119/58 |
| 5,554,248 A | * | 9/1996 | Payne | 119/51.01 |
| 5,661,956 A | * | 9/1997 | Tardif | 53/556 |
| 5,921,202 A | * | 7/1999 | Schulz | 119/58 |
| 6,213,053 B1 | * | 4/2001 | Lammers | 119/51.01 |

* cited by examiner

Primary Examiner—Charles T. Jordan
Assistant Examiner—Judith A. Nelson

(57) ABSTRACT

The livestock feeder encompasses a round bale of hay horizontally. Exposing only the flat ends to feeding livestock. The feeder shelters hay while it remains accessible to all sizes of livestock. In the preferred embodiment the invention is a molded unitary plastic shell. Being circular in shape having symmetrically open ends acting as a rigid sleeve to receive the roll of forage until entirely consumed.

1 Claim, 1 Drawing Sheet

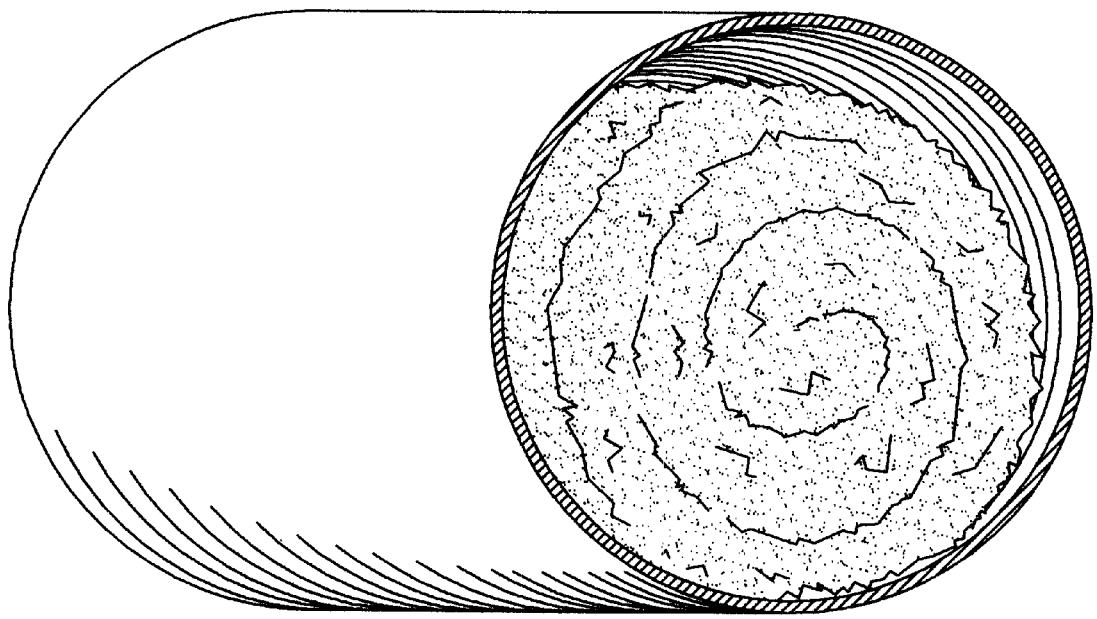

HAY BALE CONTAINER

CROSS REFERENCE TO RELATED APPLICATIONS

This application claims the benefit of U.S. Provisional application No. 60/275,120 filed Mar. 13, 2001.

BACKGROUND OF THE INVENTION

Round bale feeding devices are well known in the art. Whether vertical or horizontal, the significant dilemma is loss of nourishment caused by weather damage. Diminished feed quality and increased parasite infestations cause ill health especially in equines which until recently were not given round bales for these reasons.

U.S. Pat. No. 310,261 issued on Jan. 21, 1885 to Downing discloses a very efficient means to provide free choice forage to any livestock. However, there is no preservation of hay from spoiling weather.

U.S. Pat. No. 3,851,624 issued Oct. 9, 1973 to Leonard R. Peak discloses a ring that is tipped over the hay which is placed on the ground. While beneficial to feeding large herds, problems prevail. No common livestock can reach center therefore the ring is moved about by larger animals When the bale diminishes. The difficulty is compounded by the mud, which increases with each feeding. Unhealthful conditions associated with feeding directly from the ground are apparent.

U.S. Pat. No. 4,020,794 issued on Aug. 27, 1975 to Verlin Nethory discloses a hay feeder, which provides a substantial roof and floor for hay preservation however only small rectangular shaped or square baled hay is acceptable. In practicality a large structure is cost prohibitive and is in no wise suitable for large round bales.

U.S. Pat. No. 5,386,800 issued on Jun. 17, 1994 to Henry T. Pirok discloses a feeder that makes hay accessible as it diminishes including making the flat ends accessible and providing a box, which decreases hay falling to the ground. Though hay is protected from soil and manure, there is no preservation from inclimate weather.

As can be seen in the prior art a feeding device that provides access to hay for all sizes of livestock while preserving quality is not found. None of the above patents, taken either singly or in combination is seen to describe the instant invention as claimed.

BRIEF SUMMARY OF THE INVENTION

In the interest of nourishing valuable livestock and conserving resources, the present invention provides these advantages. The instant invention offers all types of livestock a natural position of feeding and does not seek to restrict feeding but to induce forage intake. However, conservation is greatly achieved because feeding is limited to the ends of a round bale inward. Round hay shells off or unwraps from around the sides, falling to be wasted when other wise fed.

In the preferred embodiment the feeder is a tunnel in which the round bale is inserted therefore exposing only the flat ends for feeding. Livestock comfortably enter into the tunnel far enough to consume the forage.

DESCRIPTION OF DRAWINGS

FIG. 1. Is an isometric projectional view of Jake's Hay Tunnel.

DETAILED DESCRIPTION OF THE INVENTION

Referring to the drawing, a cylinder is shown proportional to permit a roll of hay to be inserted. The design efficiently shelters forage as it diminishes.

Vertical feeders are prevalent wherein a round bale is contained. These feeders provide feeding from the ground and from which livestock have to reach through bars pushing and stretching as feed dwindles.

The instant invention relates to the natural posture of feeding livestock and improves feed conversion dramatically.

Depending upon the method used in manufacture of the feeder a polymer may be used. Injection molding is commonly used in the manufacture of thermoplastic materials. Other possible methods include extrusion followed by hot or cold stamping. In both an injection molding process and in a stamping process, it will be convenient to form the feeder in sections. This may be bolted together in the field to form a unitary structure.

Many other processes could also include blow molding, casting and thermoforming. Other processes such as rotational molding can be used to manufacture a single-piece unit in one step.

Polyethylene, particularly the high-density type with a density of at least 0.93, is a material particularly preferred for use in the above-described feeder because of low cost and environmental use.

While the invention is an open feeder it is understood that additional configurations are within the scope of the invention. For example, it may be desirable to mold one end with feeder-through apertures or x-braces as mentioned in the related provisional.

It is understood that the present invention is not limited to the sole embodiment described above, but encompasses any and all embodiments within the scope of the following claims.

I claim as my invention:

1. A free-standing plastic container being an anomalous feeder for livestock of a round hay bale, said container being a large horizontally positioned tubular housing, said tubular housing having oppositely disposed ends, either of said ends being an annular opening, said housing being proportionally disposed in that said round hay bale may be slidably fittable through said annular opening, said round hay bale being chambered into said housing through said annular opening by conventional round hay bale handling means, said round hay bale may be eccentric within said annular opening, said chambered round hay bale being available to said livestock to consume entirely through said annular opening.

* * * * *